UNITED STATES PATENT OFFICE.

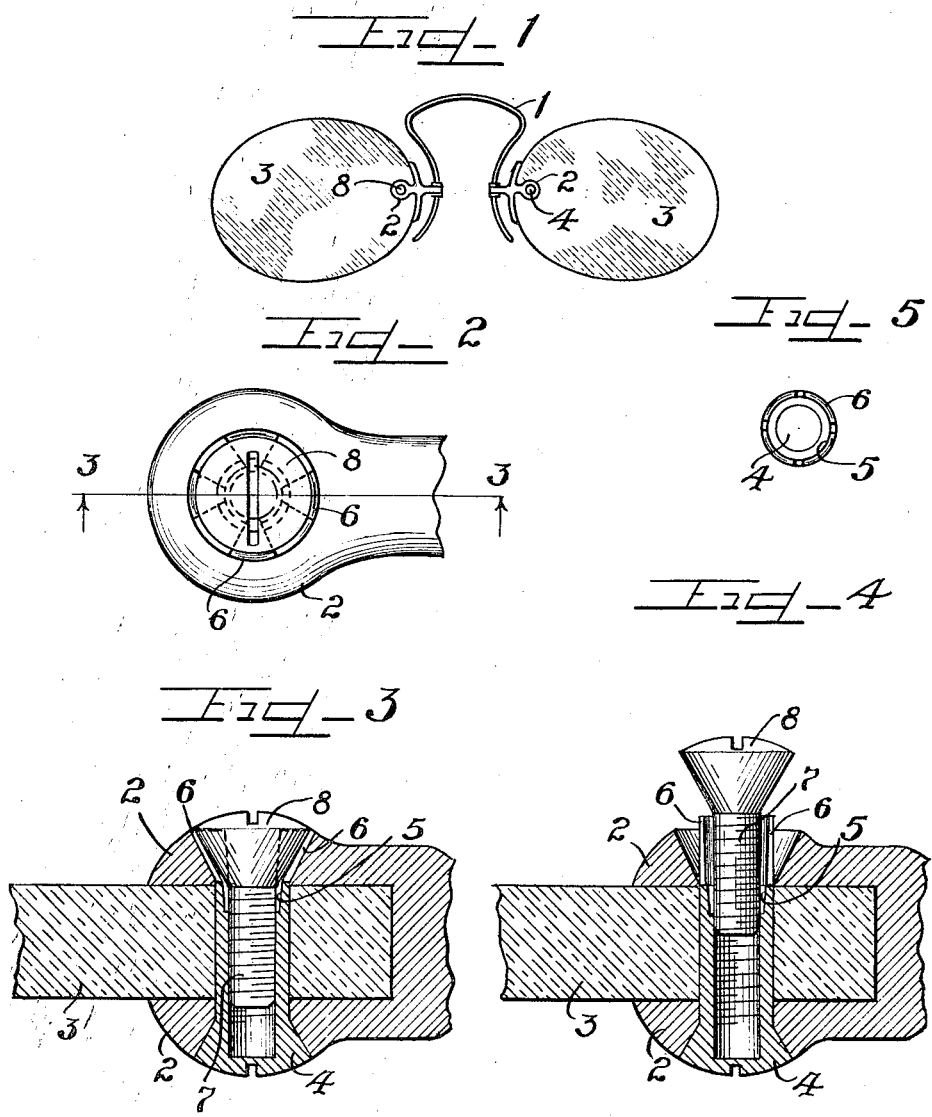

EMERY M. HAYS, OF CHICAGO, ILLINOIS, ASSIGNOR OF ONE-HALF TO SAUL PH. SIMON, OF CHICAGO, ILLINOIS.

LOCKING-SCREW.

1,150,114.  Specification of Letters Patent.  Patented Aug. 17, 1915.

Application filed February 24, 1914. Serial No. 820,440.

*To all whom it may concern:*

Be it known that I, EMERY M. HAYS, a citizen of the United States, and a resident of the city of Chicago, in the county of Cook and State of Illinois, have invented certain new and useful Improvements in Locking-Screws; and I do hereby declare that the following is a full, clear, and exact description of the same, reference being had to the accompanying drawings, and to the numerals marked thereon, which form a part of this specification.

This invention relates to an ingenious construction embracing a combination of locking screws particularly well adapted for use in securing the lenses of an eyeglass in place upon the nose guard, but with slight modification well adapted for use in practically any structure in which locking screws are desired.

In the present invention I employ a pair of complemental locking screws, one adapted to thread into the other, and the latter screw being provided with resilient means for engaging the head of the former received therein, thus obviating accidental relative movement between the two screws and preventing looseness occurring in the assembled parts.

It is an object of this invention to construct a locking device wherein one member is inserted within another and is held from retraction therefrom by resilient means for the purpose.

It is also an object of this invention to provide a construction wherein a pair of complementally threaded engaging members interfit with one another, the one provided with integral resilient means contacting the other and preventing accidental loosening of the members.

It is furthermore an object of this invention to construct a device wherein a female internally threaded screw is provided with resilient segments or leaves on its end, and is adapted to receive a male member threaded therein, the head of which is engaged by said resilient segments to prevent accidental rotation of the inserted screw, thus maintaining the parts held assembled by the device in rigid relation with one another.

It is finally an object of this invention to construct a simple device consisting of few parts, and well adapted to efficiently perform the purpose, especially in minute constructions where delicacy of adjustment is essential.

The invention, (in a preferred form) is illustrated in the drawings and hereinafter more fully described.

On the drawings, Figure 1 is a front elevation of a pair of eyeglasses, the lenses of which are retained in place by a device embodying the principles of my invention. Fig. 2 is an enlarged fragmentary elevation of a device in place, but with the lense of the eyeglass omitted. Fig. 3 is a fragmentary section on line 3—3 of Fig. 2. Fig. 4 is a view similar to Fig. 3, showing the position of the parts preliminary to the locking adjustment thereof. Fig. 5 is an end elevation of the female member of the device.

As shown in the drawings, the reference numeral 1, indicates as a whole a resilient nose guard or bridge piece of an eyeglass, provided with the usual pairs of ears 2, in the form of a yoke, apertured to receive screws therethrough to hold the lenses 3, in position. The locking screws for insertion through the apertures in said ears 2, embrace an internally threaded female member 4, internally recessed, as indicated at 5, at one end, and provided with a resilient slotted extension affording the spring segments or leaves 6. The male member of the device comprises a screw 7, having a head 8, and the ears 2 of the nose guard are recessed to receive the respective heads of the male and female members of the locking screws countersunk therein.

The operation is as follows: In the particular embodiment of my invention herein disclosed the lens 3, is placed between the ears 2, of the nose guard, with the respective apertures in said members in register with one another whereupon the female screw member 4, is inserted therethrough, after which the screw 7, is threaded into said female member, as shown in Fig. 4. As said screw 7, is screwed into place the head 8, thereof bears against the leaves or segments 6, of the female member, distending the same so that the head is tightly jammed in countersunk relation with one of the ears 2, and is surrounded by the distended spring segments, as clearly shown in Fig. 3. The frictional engagement of the segments against the head 8, prevents accidental loosening of the screws by rotation thereof. However, if it is desired to remove the lens 3, or detach the locking screw for any purpose whatsoever, the screw 7, may be removed from the female screw 4, after which the leaves or segments 6, again spring into their normal initial position, shown in Fig. 4. The purpose of the enlarged recess 5, in the female member is to permit the male member to be inserted a sufficient amount to insure clamping engagement with the resilient leaves, preventing premature contact with the rigid portion of the female member.

It is not essential that the resilient members 6, be integral with the female member 4, as obviously they may form a part of a slotted sleeve capable of insertion into place before the screw 7, is threaded into the female member 4. Obviously said leaves need not be resilient in their nature if the connection of the parts is to be permanent, as a mere deformation thereof will serve to lock the elements together.

I am aware that various details of construction may be varied through a wide range without departing from the principles of this invention. I therefore do not purpose limiting the patent granted otherwise than necessitated by the appended claims.

I claim as my invention:

1. In a device of the class described, a female member split at its outer end, and a headed male member insertible therein and adapted when seated to expand said split portion, said female member being recessed internally beyond the termination of its split portion to receive the inner end of the head of the male member.

2. In a device of the class described, a female member internally screw-threaded and split at its outer end, and a headed screw-threaded male member insertible therein and adapted when seated to expand said split portion, said female member being recessed internally beyond the termination of its split portion to receive the inner end of the head of the male member.

In testimony whereof I have hereunto subscribed my name in the presence of two subscribing witnesses.

EMERY M. HAYS.

Witnesses:
CHARLES W. HILLS, Jr.,
FRANK K. HUDSON.